US012348860B2

(12) United States Patent
Wouhaybi et al.

(10) Patent No.: US 12,348,860 B2
(45) Date of Patent: Jul. 1, 2025

(54) ROBOT SENSOR DATA MANAGEMENT

(71) Applicant: Intel Corporation, Santa Clara, CA (US)

(72) Inventors: Rita H. Wouhaybi, Portland, OR (US); Atul Hatalkar, Chandler, AZ (US); Hassnaa Moustafa, Sunnyvale, CA (US); Siew Wen Chin, Penang (MY); Sangeeta Manepalli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 17/355,213

(22) Filed: Jun. 23, 2021

(65) Prior Publication Data

US 2021/0321044 A1    Oct. 14, 2021

(51) Int. Cl.
| | |
|---|---|
| *H04N 5/232* | (2006.01) |
| *G06T 1/00* | (2006.01) |
| *G06T 7/77* | (2017.01) |
| *G06V 20/10* | (2022.01) |
| *H04N 23/65* | (2023.01) |
| *H04N 23/667* | (2023.01) |
| *H04N 23/50* | (2023.01) |

(52) U.S. Cl.
CPC ......... *H04N 23/651* (2023.01); *G06T 1/0014* (2013.01); *G06T 7/77* (2017.01); *G06V 20/10* (2022.01); *H04N 23/667* (2023.01); *H04N 23/555* (2023.01)

(58) Field of Classification Search
CPC .. G05D 1/0077; G05D 1/0246; G06T 1/0014; G06T 7/77; G06V 20/10; H04N 23/555; H04N 23/651; H04N 23/667
See application file for complete search history.

(56) References Cited

U.S. PATENT DOCUMENTS

| | | | |
|---|---|---|---|
| 2019/0204851 A1* | 7/2019 | Afrouzi | A47L 9/0405 |
| 2019/0205609 A1* | 7/2019 | Taveira | G08G 5/0013 |
| 2021/0347059 A1* | 11/2021 | Zhang | B25J 9/1697 |
| 2021/0385414 A1* | 12/2021 | Lund | G06V 10/141 |
| 2021/0405638 A1* | 12/2021 | Boyraz | G06V 20/64 |
| 2022/0161427 A1* | 5/2022 | Yerazunis | B25J 9/1674 |
| 2023/0304827 A1* | 9/2023 | Stuebler | G01C 21/3815 |

* cited by examiner

*Primary Examiner* — Md N Haque
(74) *Attorney, Agent, or Firm* — Viering, Jentschura & Partner mbB

(57) ABSTRACT

A robot may include a processor, configured to operate according to a first operational mode or a second operational mode, wherein the first operational mode comprises performing an environmental perception operation using first sensor data, wherein the first sensor data comprise no camera data, and wherein the second operational mode comprises performing the environmental perception operation using second sensor data, wherein the second sensor data comprise camera data; while operating according to the first operational mode, determine a confidence factor representing a confidence of the environmental perception operation; determine whether or not the confidence factor is outside of a range; and if the confidence factor is outside of the range, operate according the second operational mode.

18 Claims, 7 Drawing Sheets

etc.). The

ROBOT SENSOR DATA MANAGEMENT

TECHNICAL FIELD

Various aspects of this disclosure generally relate to the management of sensor data, an in particular managing the use of non-camera sensor data versus camera sensor data, in robot operation.

BACKGROUND

In many implementations, robots rely heavily on camera data for their operation (e.g., for sensing a vicinity of the robot, for detecting objects, for performing localization operations, etc.). Although, under certain circumstances, camera data may rapidly provide a wealth of information about a robot's environment, reliance on camera data may yield poor results or be undesirable in other circumstances. For example, in certain factory environments, factors such as poor lighting conditions, dust, harsh temperatures, poor air quality, or any of these, may limit the utility of camera data. Moreover, camera data may be in conflict with certain privacy requirements, which may thus make reliance on camera data undesirable. Finally, camera operation and processing of camera data may be associated with undesirable power requirements and/or computational costs.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
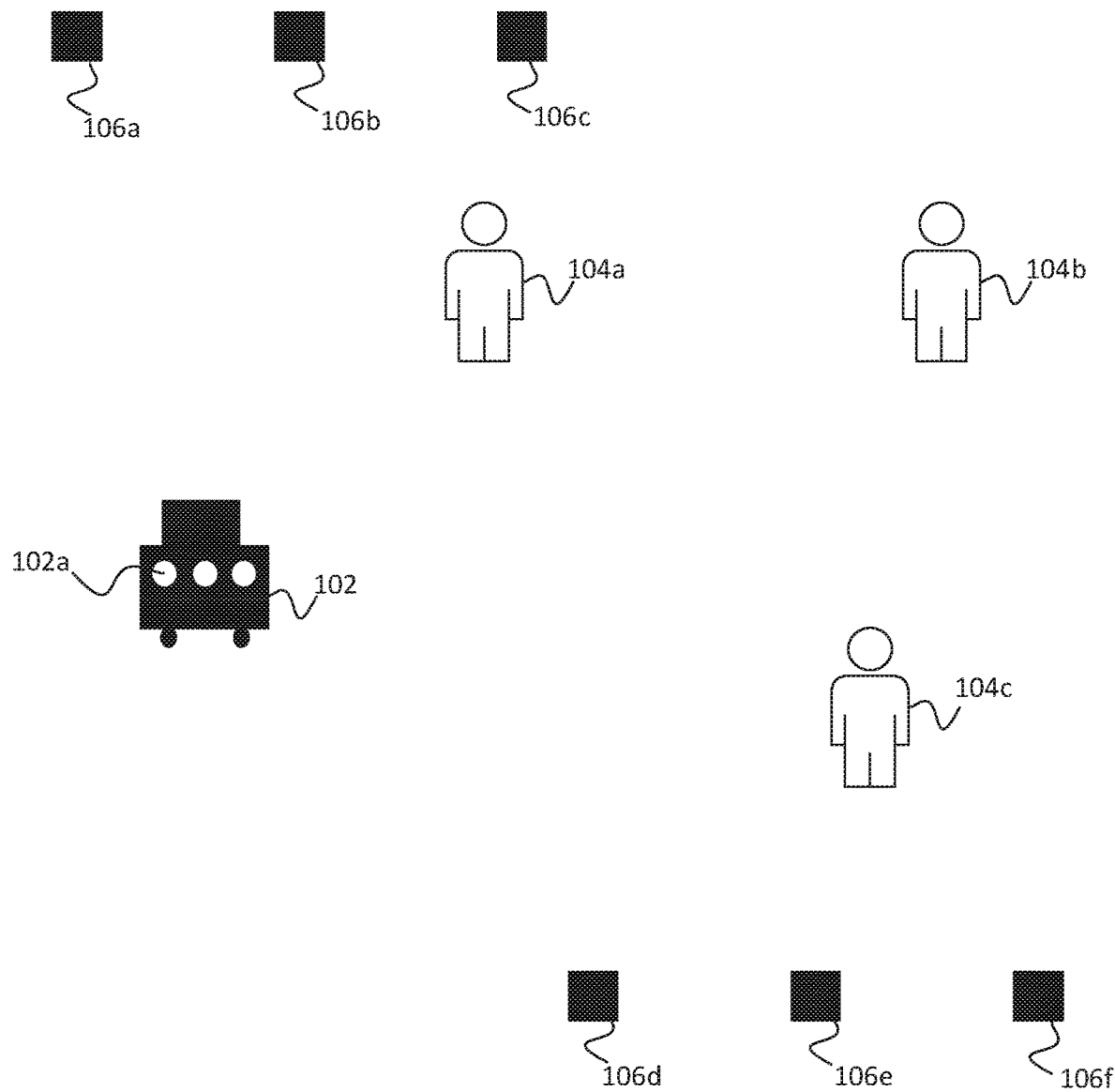
FIG. 1 depicts an exemplary industrial installation featuring a robot and optional human presence.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

In a given implementation, a robot includes a processor that is configured to operate according to a first operational mode or a second operational mode, wherein the first operational mode includes performing an environmental perception operation using first sensor data, wherein the first sensor data include no camera data, and wherein the second operational mode includes performing the environmental perception operation using second sensor data, and wherein the second sensor data include camera data. When the processor operates according to the first operational mode, the processor determines a confidence factor representing a confidence of the environmental perception operation. The processor further determines whether or not the confidence factor is outside of a predetermined range; and if the confidence factor is outside of the predetermined range, operate according the second operational mode. In this manner, the robot relies on non-camera sensor data until or unless the confidence determination becomes outside of a predetermined range, at which time the robot receives camera data, which has the effect of increasing the confidence determination. The term robot is used herein to include any device that operates autonomously. The term "robot" is intended to include at least a ground-based autonomous device (e.g. a robot on tracks, wheels or the like), an unmanned aerial vehicle, an aquatic vehicle, etc.

The environmental perception operation may include detecting an object within a vicinity of the robot and/or detecting an environmental condition of the vicinity of the robot. Robots are required to detect various details in their environment to maintain safe and/or effective operation. For these environmental detection operations, robots rely on sensor data, which provide information about particular aspects of the surrounding environment. For the purposes of this disclosure, a distinction is made between first sensor data (e.g. non-camera data) and second sensor data (e.g., data from a camera image sensor). First sensors may include any sensor other than cameras that can detect surrounding objects using either direct sensing or indirect sensing. Direct sensing may be understood as the levering of non-camera sensors to detect surrounding objects, conditions, distance from the sensing object, or any of these. This may be performed, for example, by using LIDAR and/or infrared sensors. Indirect sensing may be understood as sensing performed via Wi-Fi or any radio communication for localization of the sensing object versus its surrounding and/or through robot-to-robot communication to receive information on the robot presence relative to the other robot and/or on the presence of obstacles that a robot can detect and inform other robots in proximity.

The first sensor data may include pressure sensor data, touch sensor data, torque sensor data, accelerometer data, temperature sensor data, sound sensor data, range sensor data, LIDAR sensor data, non-camera data derived from Wi-Fi, non-camera data derived from Bluetooth, non-camera data derived from any other wireless connection, or any of these. For the sake of this disclosure, the first sensor data may optionally include any sensor data corresponding to the detection of electromagnetic waves having a wavelength outside the range of 380 nm to 700 nm. In contrast, second sensor data may optionally include sensor data corresponding to the detection of electromagnetic waves having a wavelength within the range of 380 nm to 700 nm.

Robots may perform a variety of tasks using entirely or primarily first sensor data. For example, it is known for a robot to localize itself based on a reference point and accelerometer data. In this manner, the robot may approximate its location based on data reflecting movement relative to a reference position. Other such strategies for localization or performance of other tasks based on non-camera data are also possible. For example, a robot may only perform tasks in environments of certain temperatures (e.g. a safe area of one temperature and a non-safe area of a different temperature), based on air quality (e.g. only in the presence of certain dust concentrations, or never in the presence of certain gasses), based on movement (e.g. never in the presence of moving object that suggests human presence), or any of a variety of other constellations. The specific first sensor data or combinations of non-camera sensors relied upon for a given task is essentially unlimited.

In practical applications, however, reliance upon first sensor data may provide an incomplete understanding of the environment and may result in a reduced confidence factor. In such circumstances, second data (e.g. camera data) can provide an improved understanding of the robot's environment and/or can confirm or refute a robot's understanding of its environment that had been based on first sensor data alone. For example, should it be desired to perform a certain operation only in the absence of humans (e.g., a dangerous operation or an operation whose byproducts present a danger to human health), a robot may rely on first sensor data such as temperature, infrared, sound, or the like to determine whether a human is present. However, this may provide an incomplete picture, and the robot may seek additional information in the form of second sensor data to either form a better understanding of the robot's environment or to confirm a previous assumption of the environment. Returning to the example of the presence of humans, one camera image or a small number of camera images is/are often sufficient to confirm or rule out the presence of a human. Similarly, second sensor data may provide more information about a robot's location (e.g., being near one or more markers or landmarks, viewing identifiers (e.g. QR codes or other machine readable codes) in the images, etc.). In this manner, the robot may operate primarily or even exclusively using first sensor data, and then supplement its operations with second sensor data only as needed (e.g., such as to improve a confidence factor).

Such managing of sensor data sources, and therefore the increased ability to rely on first sensor data presents several advantages. First, second sensor data, despite its usefulness as described above, comes at the cost of energy usage and computational demands. Cameras themselves may have higher power consumption than many non-camera sensors, which are often able to be operated with very little power. Moreover, once the camera data are obtained, there can be significant computational costs to processing these data. For example, current methods to process image sensor data include photogrammetry (e.g., such as to create a three dimensional model of an environment from second sensor data), object detection and avoidance, and the like. The specifics of these techniques will not be described herein, but it is instead merely stated that any known techniques for deriving information from camera data may be employed. These techniques may require significant processing power, which in turn translates into higher power requirements to operate the processors, higher component prices to include processors that are capable of performing these operations, or both. Thus, increasing reliance on first sensor data/decreasing reliance on second sensor data may be cost-saving and/or power saving.

A second advantage to increased reliance on first sensor data is that second sensor data may be unavailable or of limited use in certain circumstances, and the ability to rely on first sensor data may provide a more complete understanding of an environment than reliance on incomplete or diminished second sensor data. For example, cameras may require appropriate lighting and air quality to provide useful second sensor data. In environments with low lighting, glares, particularly bright lighting, or in which the air is dusty or contains certain gasses, the images provided by cameras may be noisy or dim or may otherwise be of limited utility. In such situations, it is advantageous to manage sensor data requirements such that the robot can perform its tasks using primarily or entirely first sensor data.

A third advantage to increased reliance on first sensor data is reduction or elimination of privacy concerns. In some jurisdictions, image data containing human images triggers certain legal responsibilities and/or limitations. For example, it may be prohibited to store images of a human face without express permission from the respective person. Furthermore, there may be other privacy concerns, or other reasons why it is undesirable to create a visual record of human presence or action. Whatever the reason, increased or primary reliance on first sensor data may alleviate the problem.

The robot may be configured to operate according to one of a plurality of context modes to manage the reliance on first sensor data as opposed to second sensor data. Each context mode of the plurality of context modes may have a unique predetermined range, wherein determining whether the confidence factor is outside of the predetermined range includes determining whether the confidence factor is outside of the unique predetermined range of the context mode according to which the robot is operating.

One exemplary context mode may be a safety context mode. Certainly, robots must be configured to perform their actions safely for humans in their environment. In some circumstances, such as when are likely to be in close contact with robots, or when the robots may perform activities that may otherwise be hazardous to human health, it may be necessary to implement a context mode in which additional safety measures are required. For example, robots that may travel at significant speeds across a factory floor may implement a safety context mode when humans are present or a specific number of humans on the factory floor is reached; conversely, these robots may exit the safety context mode when humans are not present or when a number of humans falls beneath a predetermined value. The safety context mode may require a higher confidence factor (e.g. a confidence factor that requires a higher degree of confidence and therefore results in greater use of camera data) then a non-safety context mode, which may be satisfied with a lower confidence factor. Otherwise stated, second sensor data/camera data may provide the most reliable information about the presence of humans, and where it is of particular importance to avoid humans or otherwise protect humans, a greater confidence factor may be utilized such that second sensor data/camera data are used more often, thereby resulting in greater confidence that human contact or human harm will be avoided.

A second exemplary context mode may be a power saving context mode. In this context mode, first sensor data may be more strongly preferred over second sensor data for power saving measures. In many implementations, robots are reliance on battery power to perform their various functions. Due at least to reliance on battery, power efficiency may be of significant importance, and it may be desirable to implement procedures to increase the robots' power efficiency. As discussed elsewhere in this disclosure, first sensor data may be associated with reduced power usage compared to second sensor data, and therefore an increase in reliance on first sensor data and/or decrease in reliance on second sensor data may result in overall power savings. On a practical level, a robot may monitor its available power storage and predict whether it will be able to continue performing its tasks (e.g. have remaining power to continue performing its tasks) until the end of its shift/mission. Should the robot determined that it has insufficient stored power, the robot may implement a power saving context to reduce its power consumption by shifting emphasis from second sensor data to for sensor data. Additionally or alternatively, the ability to enter a power saving mode may permit the robot to operate using a reduced capacity battery and/or a reduced capacity processor, which may be desirable for certain implementations. It is expressly noted that the examples of a safety context mode and a power saving context mode are provided herein for demonstrative purposes; the robot disclosed herein may be configured to operate according to a safety context mode, a power saving context mode, or both of these. The robot according to this disclosure may alternatively or additionally be configured to operate according to one or more other context modes.

A third exemplary context mode may be a privacy mode. As stated above, certain jurisdictions may limit or preclude the use and/or storage of images of humans, and therefore it may be necessary to avoid detecting or at least storing camera data when humans are present. Furthermore, there may be privacy concerns related to the identity of human images (e.g. facial images, identifying images, etc.). In light of this, a privacy context mode may be implemented to ensure compliance with these aims. In the privacy context mode, the robot may rely entirely on first sensor data, and second sensor data may be prohibited or sharply reduced. Alternatively or additional, the privacy context mode may preclude image data (second data) from being stored, other than for very brief storage necessary for image processing.

Alternatively or additionally, image data (second data) may be assessed to determine whether humans can be identified in the image data. If humans are identified, the data will be deleted or isolated. If humans are not identified, then the data may be used for location, positioning, etc.

The robot may be configured to receive sensor information from any of a variety of sources, including sensor information local to the robot and/or sensor information external to the robot. That is, the robot may be configured with one or more sensors, in the robot may activate or deactivate any or all of its own sensors as desired. The fact that the robot may be equipped with a plurality of sensors notwithstanding, the robot may have access to sensors from one or more external devices within its environment. That is, in many applications, a robot will not operate in complete isolation, but rather in conjunction with or at least alongside one or more other sensor-containing machines (e.g. other robots, other processor-controlled sensor containing devices, other sensors configured to send their data to the robot, other sensors connected to transmitters to send the sensor data to the robot, or otherwise). The robot may be configured to discover other sensors in its environment (e.g. sensors not directly connected to the robot and/or not directly under the robot's control) and to select one or more sensors for receipt of their sensor information.

The robot may be configured to receive sensor identifiers from the various sensors within the vicinity of the robot. The sensor identifiers may include a unique identifier of a specific sensor, a type of data provided by the sensor, a type of sensor, a location of the sensor, a location or focus corresponding to the sensor data, a prior history of use of the sensor data by one or more robots, a predicted usability of the sensor data by this robot, or any of these. That is, one or more sensors may send information to a robot in their vicinity, such that the robot may be able to select one or more of the sensors (e.g. all of the sensors or a subset of the sensors) for receipt of their sensor data, such that the robot may incorporate the sensor data into its processing routines. This information received from the sensors may be initiated by one or more sensors themselves, one or more other processors or devices, or may be in response to a request from the robot. That is, the robot may send (e.g. for example when entering a new area) a request for the available sensor data, and in response, the robot may receive sensor identifiers from the various sensors that are available. Upon receiving the sensor information, the robot may be further configured to designate the sensor identifiers of the sensors within the vicinity of the robot as detecting first sensor data or second sensor data, based on sensor type.

Should the robot select one or more of the sensors for receipt of their sensor data, the corresponding sensor data may be delivered to the robot using any known method. Such methods may include, but are not limited to, delivery over Wi-Fi, delivery over Bluetooth, delivery via an optical signal, delivery via an electrically conductive connection (e.g. a wired connection), or otherwise. The received sensor data may be first sensor data and/or second sensor data. That is, the received sensor data may include no camera data or may include camera data. Should the received sensor data include no camera data (e.g. first sensor data) the robot may request such data to augment sensor data otherwise available to the robot. For example, should a sensor of a specific type be useful but unavailable from the robot itself, the robot may request sensor data from the sensor of the specific type to be delivered to the robot. Alternatively or additionally, the requested sensor data may be sensor data corresponding to a sensor type that is in fact available to the robot. In such a circumstance, it may be desirable for the robot, such as for power-saving reasons, not to activate a specific local (e.g. located on the robot) sensor and instead to request delivery of sensor data from a remote source.

Should the requested sensor data be or contain second sensor data, the robot may request data from specific cameras that may be deemed likely to provide useful information. Otherwise stated, when multiple cameras are available, they will generally be directed toward different areas or otherwise have different areas of focus. As such, the sensor data from any camera may be more relevant or less relevant than sensor data from any other camera. The robot may be configured to select a camera for delivery of its sensor data based on a likelihood that the selected camera will provide sensor data that is useful for a particular purpose. For example, the robot may be expected to localize itself or otherwise maintain an estimation of its position relative to one or more reference points. Based either on a current estimated position of the robot or an anticipated future position of the robot, the robot may select one or more cameras for delivery of camera data because such one or more cameras provide information about a current position of the robot, an anticipated future position of the robot, or a path of travel between the current position in the anticipated future position.

In some configurations, the robot and/or one or more processors may be configured to receive sensor data from the various external sensors and may be further configured with a neural network for selecting one or more external sensors for sensor data delivery. The neural network may be configured to receive information about previous uses of various sensors. The neural network may be configured to receive success rates (e.g. degrees of usefulness of the sensor data, changes in confidence factors, etc. associated with the prior use of sensor data from such sensors) of prior uses of a sensor, and may be configured to predict a usefulness of sensor data from the given sensor based on the current operating conditions of the robot (e.g. robot location, air quality, lighting, power availability, task requirements, or any of these). Based on the prediction from the neural network, the robot may select one or more sensors for data delivery. The neural network may optionally be or include a convolutional neural network configured to receive first sensor data, and to output robot environment information based on the received first sensor data, and wherein the processor is configured to perform a robot operation based on the robot environment information.

Upon selecting one or more external sensors for sensor data delivery, the robot may be optionally configured to control a transceiver to send a signal representing a request for sensor identifiers of sensors within a vicinity of the robot. That is, the robot may be configured to communicate with the sensors and/or with one or more devices connected to and/or controlling the sensors, to request sensor data. This request may be sent via any known method, whether wired or wireless communication.

In some configurations, the request for additional sensor data (e.g. external sensor data, may be closely associated with the switching of the robot from the first operational mode to the second operational mode. That is, the robot may not be equipped with a camera, or it may be undesirable for the robot to activate its own camera (e.g. because of the available field of vision of the camera, the available area of focus of the camera, a power requirement of the camera, etc.). In such cases, the robot may request camera data from one or more external cameras, such that the robot may receive said camera data to operate according to the second operational mode. The request may optionally specify a duration of camera data to be sent, a number of image frames to be sent, or otherwise. The robot may calculate the optional duration of camera data and/or number of image frames to be sent based on an estimated quantity of camera data necessary to raise the confidence factor to lie within the predetermined range.

FIG. 1 depicts an exemplary industrial installation featuring a robot and optional human presence. In this industrial installation, a robot 102 is present to perform any of a variety of tasks. The robot may occasionally or constantly work alongside or in the vicinity of one or more humans 104a-c. The robot may switch between a first operational mode and a second operational mode during the course of its work. In the first operational mode, the robot may utilize non-camera sensor data (referred to throughout as first sensor data) to perform one or more tasks (e.g. localization, movement within the industrial installation, or otherwise). In the second operational mode, the robot may utilize camera data (referred to throughout as second sensor data), or a combination of camera data and non-camera sensor data, to performance various tasks. Whether in the first operational mode of the second operational mode, the robot 102 may operate using sensor data from sensors that are local to the robot (e.g. sensor 102a (other sensors depicted as white dots on the robot but not labeled), sensors external to the robot 106a-f, or a combination of these.

Figure 2:
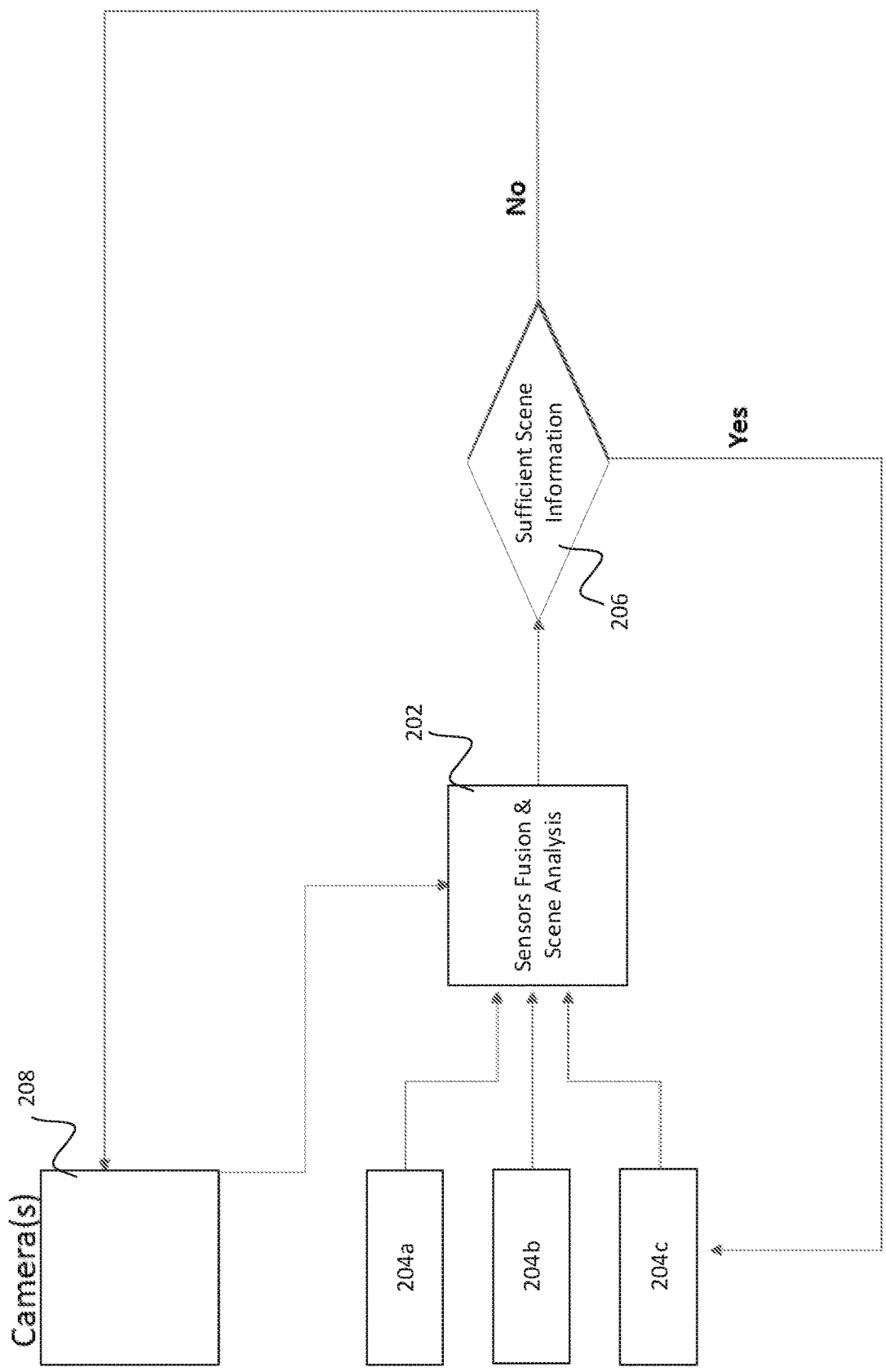
FIG. 2 depicts a procedure from switching between the first operational mode and the second operational mode.

FIG. 2 depicts a procedure of switching between the first operational mode and the second operational mode. That is, FIG. 2 depicts use of first sensor data with on-demand second sensor data (e.g. camera) solicitation. The robot may include a processor, which may be configured to run a sensor fusion and scene analysis module 202. The sensor fusion and scene analysis module 202 may be configured to receive sensor data from one or more first sensors 204a-c (that is, one or more non-camera sensors) and from the sensor data to calculate whether sufficient scene information exists 206. The determination of whether sufficient scene information exists 206 may be described in terms of calculation of a confidence factor, which may represent a confidence of an environmental perception operation. Various techniques are known in the art (e.g. in the field of statistics, in object detection, in autonomous navigation) for calculation of a confidence factor based on sensor information and any such technique may be used for this purpose. If the robot determines that sufficient scene information exists (e.g. a confidence factor is within a predetermined range) 206, then the robot continues to receive first sensor data only from the first sensors 204a-c and continues to perform sensor fusion and scene analysis 202. If the robot determines that sufficient scene information does not exist 206, then the robot may trigger sensing of second sensor data through one or more cameras 208. These cameras 208 may be located on or as part of the robot, external to the robot, or a combination of these.

Figure 3:
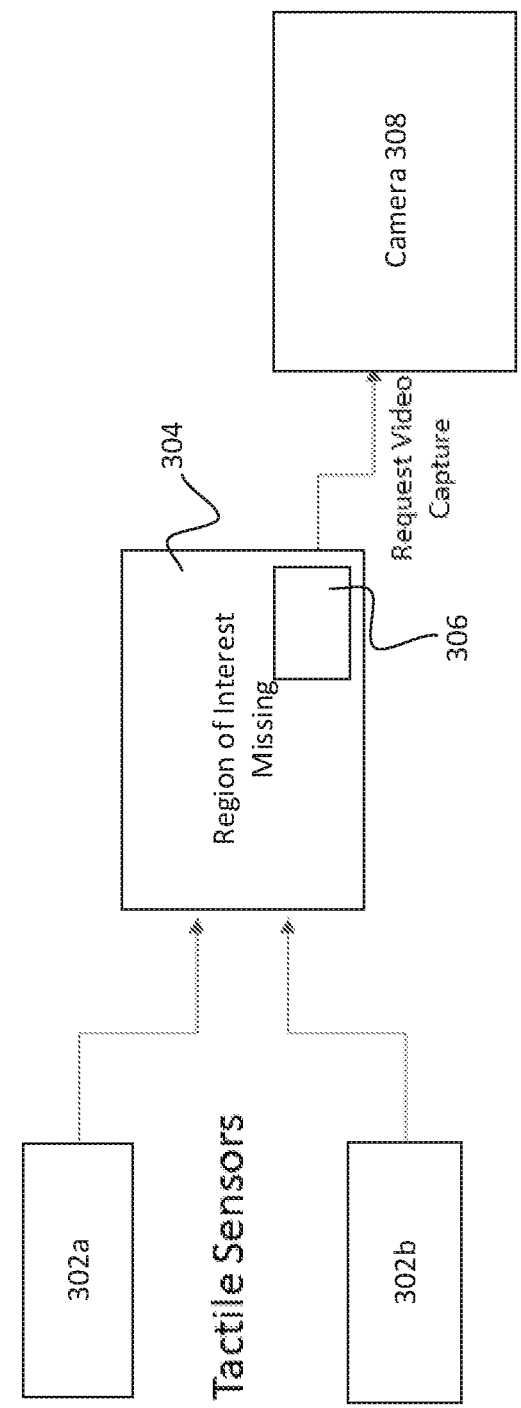
FIG. 3 depicts a switching from the first operational mode to the second operational mode and the further selection of a camera for providing second sensor data based on the camera's capturing of a region of interest.

FIG. 3 depicts a switching from the first operational mode to the second operational mode and the further selection of a camera for providing second sensor data based on the camera's capturing of a region of interest. In this manner, FIG. 3 may be understood as depicting a sensing pipeline of direct sensing using first sensors, which may complement second sensor data or be used (at least temporarily) instead of second sensor data. In this case, the robot may be configured to receive first sensor data from first sensors (non-camera sensors) 302a-b. Although the first sensors may be any kind of non-camera sensors, and exemplary configuration may include a LIDAR sensor and an infrared sensor.

Upon receiving the first sensor information, the robot may process the first sensor information to determine a confidence factor. As part of the confidence factor determination, the robot may determine whether a region of interest is missing from its sensor data 304. That is, the robot may determine whether it lacks sensor data corresponding to a location (e.g. its present location, and intended location, or a location between its present location and an intended location) and, if so, may trigger the receipt of camera data. The robot may be configured with a camera trigger module 306, which may implement an instruction to obtain camera data and/or a request to obtain camera data from one or more cameras 308. The robot may implement the camera trigger module 306, whether in hardware or software, or alternatively the camera trigger module 306 may be implemented external to the robot, such that the robot issues a request to the camera trigger module 306, which then requests the sensor data from the various cameras 308.

According to an aspect of the disclosure, camera streams may be processed at the host platform. The robot may have a predefined duration in which to discover a region of interest in its available first sensor data. If the robot cannot or does not discover a region of interest within this predefined duration of time, the robot may trigger the camera activation. One or more applications on the robot may define the predetermined duration. In triggering the camera activation, the robot may send a capture request to the camera. The capture request may include a capture configuration (e.g., including a precise location, an angle, a number of frames, a duration of camera image, or any of these). The robot may use an application programing interface (API) for the camera capture trigger and/or use a control channel a software development kit such as a software development kit for one or more cameras.

Figure 4:
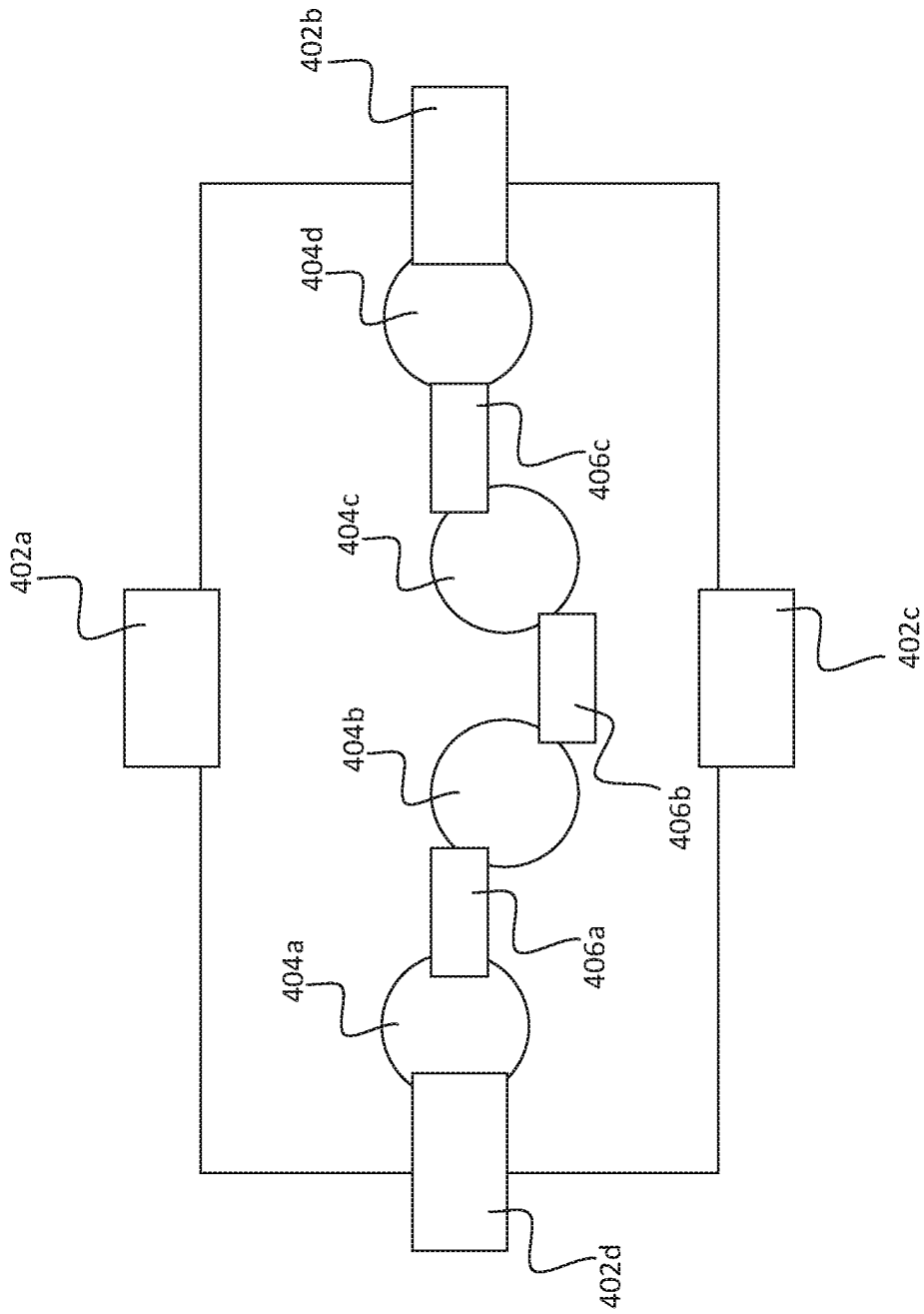
FIG. 4 depicts an optional robot to robot communication for sharing of sensor data or determinations derived from sensor data.

FIG. 4 depicts an optional robot to robot communication for sharing of sensor data or determinations derived from sensor data. The robots in an installation may be configured to perform radio communication for localization. In this manner, the robots may include beacon radios (e.g., Bluetooth radios), which may allow a receiving robot to create a location map, such as by using known location by reference algorithms that leverage radio beaconing to localize objects. If any one robot creates a localization map, then the robot may share the localization map or any related data to any of the other robots in the installation. In this matter, a robot may receive a distributed location map in an up-to-date fashion. Such consumption of the location map by the various robots permits the robots to obtain real-time information on the obstacles present and on other devices present with precise localization.

The robot may perform robot to robot communication using any wireless communication protocol, such as, for example, Wi-Fi, 5G, D2D, V2V, and the like. This communication allows the robots to establish a kind of platooning (one robot with advanced capabilities doing careful detection using diverse tactile sensors and sharing alerts with other robots in its proximity, and the proximity region can be tuned based on the deployment scenario).

As depicted in FIG. 4, an industrial installation may include various building equipment 402a-d, a plurality of robots 406a-c, and regions of wireless connection between the various robots 404a-d. In this manner, the robots may be linked with one another (e.g. such as through a wireless connection, Wi-Fi, 5G, D2D, V2V, or otherwise) and may share their sensor data and/or calculations. For example, should robot 406a receive second sensor data, robot 406a may share its second sensor data and/or any determinations derived from the second sensor data (e.g. objects, obstacles, point clouds, depth information, human location, industrial hazards, or otherwise) to robot 406b through wireless connection 404b; similarly, robot 406b may share this information with robot 406c through wireless connection 404c, and so on. Alternatively or additionally, one of these robots, for example robot 406a may obtain second sensor data from the building equipment 402d (e.g. a mounted camera as part of the industrial installation) through wireless connection 404a. Of course, any of the robots may be configured to receive sensor information or determinations derived therefrom from any of the elements of building equipment 402a-d and/or from any of the other robots 406a-c.

Figure 5:
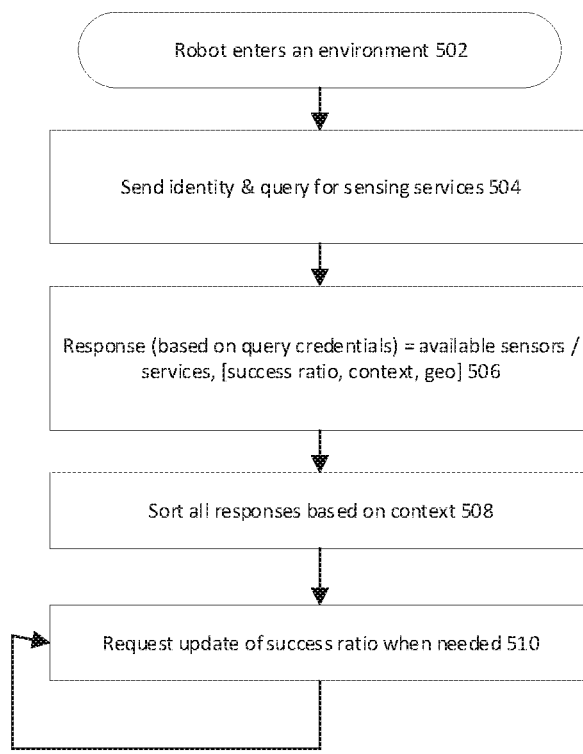
FIG. 5 depicts an optional request for sensor information.

FIG. 5 depicts an optional request for sensor information. The robot may be configured to enter an environment 502 and to send an identity and query for a sensing service (e.g. a query for one or more first sensors and/or one or more second sensors) 504. The robot may receive a response (such as based on query credentials), the response including available sensors, available services, a prior success rate or ratio, a sensor context, a geography, or any of these 506. The robot may be configured to sort the responses based on context 508, such as based on a particular context mode (e.g. a safety context mode, a power saving context mode, or otherwise). The robot may be configured to request an update of the success ratio as needed 510.

Figure 6:
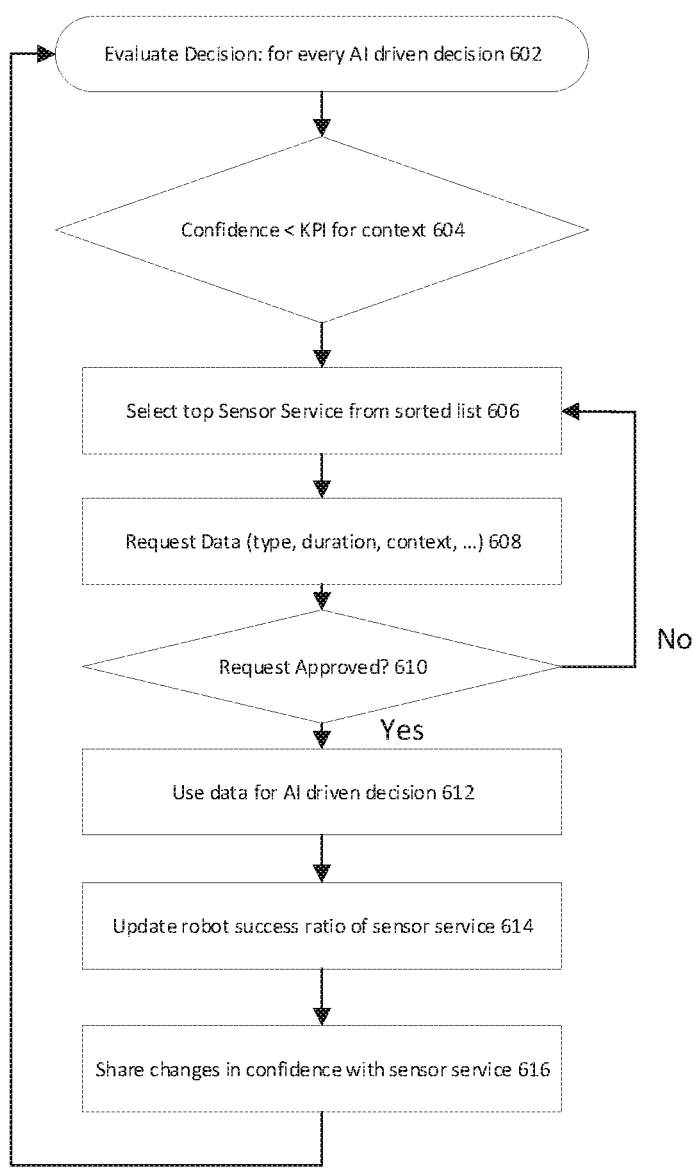
FIG. 6 depicts sensor management/operational mode management as described herein using an artificial intelligence.

FIG. 6 depicts sensor management/operational mode management as described herein using an artificial intelligence. In this case, the robot may be configured with an artificial intelligence (e.g. an artificial neural network, a convolutional neural network, etc.) and may be configured to perform a decision evaluation for every artificial intelligence driven decision 602. For example, the robot may be configured to determine a confidence factor 604. In one configuration, the robot may compare the confidence factor to a key performance indicator (e.g. a threshold value) 604. The key performance indicator may be a key performance indicators specific for a context in which the robot is operating (e.g. a safety mode context or a power saving mode context). In another configuration, the key performance indicator may be a range rather than a threshold value, and the robots comparison of the confidence to the key performance indicator may be a determination of whether the confidence is within a range of key performance indicator or outside of a range of key performance indicator. If the confidence factor is less than the key performance indicator or outside of the range of the key performance indicators 604, the robot may select a sensor service from a sorted list of sensor services 606. This may be, for example, a list received by the robot upon entry into the vicinity and optionally as a response to the robot's request. Based on the selected sensor service from the sorted list 606, the robot may request data from one or more sensors 608. This data request may include data type, data duration, data context, or any of these. The robot may receive a response to the request, such as an approval or denial 610. In many configurations, security may be of significant importance and the sensor data may be available only to certain authorized users and/or for certain purposes. Thus, a robot requesting sensor information may be subject to one or more checks or authentication/verification procedures. Should it be determined that the robot is permitted to access the sensor information, the robot may receive a request for approval. If the robot receives a denial of the request, then the robot may select a nether sensor service from the sorted list 606. Assuming the robot receives an approval, the robot may use the received sensor data for one or more artificial intelligence driven decisions 612. The robot may determine whether the received data were useful (e.g. whether they provided information about a missing location, whether they assisted the robot in making a decision, or otherwise), and based on this the robot may update a success ratio of the sensor service 614. The success ratio of the sensor service may be a ratio stored and/or managed on the robot. Alternatively or additionally, the success ratio of the sensor service may be a ratio stored and/or managed by an outside device (e.g. by the sensor, by a processor operating the sensor, by a central processor, or otherwise). Assuming that this ratio is stored external to the robot, the robot may share its change in confidence with the sensor service 616. This procedure may be performed for any or all artificial intelligence driven decisions.

Figure 7:
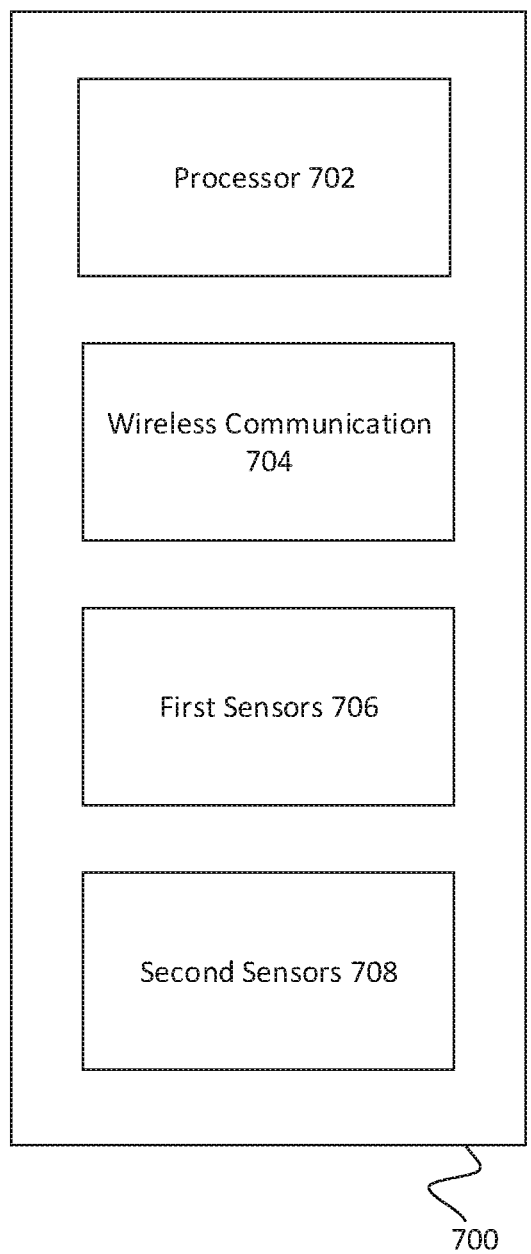
FIG. 7 depicts a robot with various optional and non-optional elements.

FIG. 7 depicts a robot 700 that includes a processor 702. The processor is configured to operate according to a first operational mode or a second operational mode. The first operational mode includes performing an environmental perception operation using first sensor data, wherein the first sensor data include no camera data. The second operational mode includes performing the environmental perception operation using second sensor data, wherein the second sensor data include camera data. These data may be from an on-board camera and/or from an off-board camera. While operating according to the first operational mode, the processor determines a confidence factor representing a confidence of the environmental perception operation, determines whether or not the confidence factor is outside of a predetermined range; and if the confidence factor is outside of the predetermined range, operates according the second operational mode. In combination with any other one or more feature of this paragraph, the environmental perception operation may optionally include detecting an object within a vicinity of the robot or detecting an environmental condition of the vicinity of the robot. In combination with any other one or more feature of this paragraph, wherein the robot is optionally configured to operate according to one of a plurality of context modes, each context mode of the plurality of context modes having a unique predetermined range; wherein determining whether the confidence factor is outside of the predetermined range includes determining whether the confidence factor is outside of the unique predetermined range of the context mode according to which the robot is operating. In combination with any other one or more feature of this paragraph, the plurality of context modes may optionally include a safety mode and a power-saving mode, and the unique predetermined range of the safety mode may optionally require a greater confidence factor than a confidence factor required by the unique predetermined range of the power-saving mode. In combination with any other one or more feature of this paragraph, the processor may optionally be configured to receive a first signal representing sensor identifiers of sensors within a vicinity of the robot. In combination with any other one or more feature of this paragraph, the processor may further be configured to designate the sensor identifiers of the sensors within the vicinity of the robot as detecting first sensor data or second sensor data, based on sensor type. In combination with any other one or more feature of this paragraph, the processor may optionally be further configured to control a transceiver to send a second signal representing a request for sensor identifiers of sensors within a vicinity of the robot, wherein the first signal is received in response to the second signal. In combination with any other one or more feature of this paragraph, the first signal may optionally further represent a location within the vicinity of the robot corresponding to sensor data detected by a sensor of the sensors within the vicinity of the robot, and wherein operating according to the second operational mode includes sending a signal representing a request for sensor data of a sensor of the plurality of sensors whose sensor data correspond to a location of the robot. In combination with any other one or more feature of this paragraph, if the processor operates according to the second operational mode, the processor is configured to determine an amount of camera data necessary to bring the confidence factor within the predetermined range and to receive an amount of camera data corresponding to the determined amount of camera data. In combination with any other one or more feature of this paragraph, the first sensor data may optionally include pressure sensor data, touch sensor data, torque sensor data, temperature sensor data, sound sensor data, range sensor data, LIDAR sensor data, Wi-Fi data, data derived from Wi-Fi data, Bluetooth data, data derived from Bluetooth data, or any of these. In combination with any other one or more feature of this paragraph, the first sensor data may optionally further include data of any sensor configured to detect electromagnetic waves having a wavelength outside the range of 380 nm to 700 nm, and the second sensor data may optionally include data of a sensor configured to detect electromagnetic waves having a wavelength within the range of 380 nm to 700 nm. In combination with any other one or more feature of this paragraph, the robot may optionally further include a convolutional neural network, configured to receive first sensor data, and to output robot environment information based on the received first sensor data, and wherein the processor is configured to perform a robot operation based on the robot environment information. In combination with any other one or more feature of this paragraph, operating according to the second operational mode may optionally further include switching on a camera (e.g., such as on the robot) and/or causing a camera to be switched on (e.g., such a camera external to the robot).

Context modes may be selectable for a given implementation. For example, before an implementation is deployed it may be desirable to determine an appropriate set of context modes (e.g. safety modes, privacy modes, power saving mode, etc.), such as based on pre-assessment of the environment). Each mode may further consist of multiple 'operational states' that reflect certain dynamics of the environment. At the beginning of each run, each robot may receive (e.g. be assigned) a safety-mode for the environment based on current 'safety-level-assessment'. For example, a robot may operate with <safety-mode='reduced'> (e.g. not in safety context mode, in a modified version of a safety context mode, etc.) when no humans are present. A given mode may be applicable to all equipment in the environment (e.g. to all robot, automation, and or other environmental sensors/actuators). Context modes may be re-assessable throughout a mission. In this manner, the robot and/or an underlying control system may assess the environment for changes. When the robot or the control system detects a relevant change, (e.g., humans enter the vicinity of the robot), the robot may change into the safety context mode and may dynamically reconfigure its sensing-modality and/or other safety parameters of its equipment. The robot may optionally be configured to continue the mission only when the robot receives confirmation that its equipment confirms that the context mode is changed.

As a further optional feature, one or more context modes may be understood as being temporarily uninterruptable, such as for a predetermined duration. For example, in the event that a robot is operating according to a context mode that requires high resolution camera, but cameras are generally not desired when humans are present, the current operational context may prevent humans from entering for a predetermined length of time (e.g., until the end of the context mode). In such a situation, operating according to the context mode may include controlling or causing to be controlled certain peripheral actuators, such as door locks, to prevent humans from entering the area.

As a further optional feature, the sensed data may be isolated (e.g., "sandboxed") to promote security and/or privacy. Using this tactic, data collected during certain context modes may be tagged and handled separate from other data. For example, when human-privacy is a concern, the data from certain sensors may be obfuscated, encrypted, archived, or any of these whenever an operational state indicates that humans may be present.

Additional aspects of the disclosure will be described by way of example:

In Example 1, a robot, including a processor, configured to operate according to a first operational mode or a second operational mode, wherein the first operational mode includes performing an environmental perception operation using first sensor data, wherein the first sensor data include no camera data, and wherein the second operational mode includes performing the environmental perception operation using second sensor data, wherein the second sensor data include camera data; while operating according to the first operational mode, determine a confidence factor representing a confidence of the environmental perception operation; determine whether or not the confidence factor is outside of a predetermined range; and if the confidence factor is outside of the predetermined range, operate according the second operational mode.

In Example 2, the robot of Example 1, wherein the environmental perception operation includes detecting an object within a vicinity of the robot or detecting an environmental condition of the vicinity of the robot.

In Example 3, the robot of Example 1, wherein the robot is configured to operate according to one of a plurality of context modes, each context mode of the plurality of context modes having a unique predetermined range; wherein determining whether the confidence factor is outside of the predetermined range includes determining whether the confidence factor is outside of the unique predetermined range of the context mode according to which the robot is operating.

In Example 4, the robot of Example 3, wherein the plurality of context modes includes a safety mode and a power-saving mode, and wherein the unique predetermined range of the safety mode requires a greater confidence factor than a confidence factor required by the unique predetermined range of the power-saving mode.

In Example 5, the robot of any one of Examples 1 to 4, wherein the processor is further configured to receive a first signal representing sensor identifiers of sensors within a vicinity of the robot.

In Example 6, the robot of Example 5, wherein the processor is further configured to designate the sensor identifiers of the sensors within the vicinity of the robot as detecting first sensor data or second sensor data, based on sensor type.

In Example 7, the robot of Example 5 or 6, wherein the processor is further configured to control a transceiver to send a second signal representing a request for sensor identifiers of sensors within a vicinity of the robot, wherein the first signal is received in response to the second signal.

In Example 8, the robot of any one of Examples 5 to 7, wherein the first signal further represents a location within the vicinity of the robot corresponding to sensor data detected by a sensor of the sensors within the vicinity of the robot, and wherein operating according to the second operational mode includes sending a signal representing a request for sensor data of a sensor of the plurality of sensors whose sensor data correspond to a location of the robot.

In Example 9, the robot of any one of Examples 1 to 8, wherein, if the processor operates according to the second operational mode, the processor is configured to determine an amount of camera data necessary to bring the confidence factor within the predetermined range and to receive an amount of camera data corresponding to the determined amount of camera data.

In Example 10, the robot of any one of Examples 1 to 9, wherein the first sensor data include pressure sensor data, touch sensor data, torque sensor data, temperature sensor data, sound sensor data, range sensor data, LIDAR sensor data, or any of these.

In Example 11, the robot of Example 10, wherein the first sensor data further include data of any sensor configured to detect electromagnetic waves having a wavelength outside the range of 380 nm to 700 nm.

In Example 12, the robot of any one of Examples 10 or 11, wherein the second sensor data include data of a sensor configured to detect electromagnetic waves having a wavelength within the range of 380 nm to 700 nm.

In Example 13, the robot of any one of Examples 1 to 12, wherein the robot further includes a convolutional neural network, configured to receive first sensor data, and to output robot environment information based on the received first sensor data, and wherein the processor is configured to perform a robot operation based on the robot environment information.

In Example 14, the robot of any one of Examples 1 to 13, wherein operating according to the second operational mode further includes switching on a camera, wherein the camera is a camera in or on the robot, or wherein the camera is a camera external to the robot in a vicinity of the robot.

In Example 15, a sensor data management system, including: a robot, including:
a processor, configured to: operate according to a first operational mode or a second operational mode, wherein the first operational mode includes performing an environmental perception operation using first sensor data, wherein the first sensor data include no camera data, and wherein the second operational mode includes performing the environmental perception operation using second sensor data, wherein the second sensor data include camera data; while operating according to the first operational mode, determine a confidence factor representing a confidence of the environmental perception operation; determine whether or not the confidence factor is outside of a predetermined range; and if the confidence factor is outside of the predetermined range, operate according the second operational mode.

In Example 16, the sensor data management system of Example 15, wherein the environmental perception operation includes detecting an object within a vicinity of the robot or detecting an environmental condition of the vicinity of the robot.

In Example 17, the sensor data management system of Example 15, wherein the robot is configured to operate according to one of a plurality of context modes, each context mode of the plurality of context modes having a unique predetermined range; wherein determining whether the confidence factor is outside of the predetermined range includes determining whether the confidence factor is outside of the unique predetermined range of the context mode according to which the robot is operating.

In Example 18, the sensor data management system of Example 17, wherein the plurality of context modes includes a safety mode and a power-saving mode, and wherein the unique predetermined range of the safety mode requires a greater confidence factor than a confidence factor required by the unique predetermined range of the power-saving mode.

In Example 19, the sensor data management system of any one of Examples 15 to 18, further including an external sensor circuit, external to and not directly controlled by the robot, wherein the external sensor circuit includes an external sensor; wherein the robot is further configured to receive a first signal from the external sensor circuit representing a sensor identifier of the external sensor.

In Example 20, the sensor data management system of Example 19, wherein the robot is further configured to designate the sensor identifier as detecting first sensor data or second sensor data, based on sensor type.

In Example 21, the sensor data management system of Example 19 or 20, wherein the robot is further configured to control a transceiver to send a second signal representing a request for a sensor identifier of a sensor within a vicinity of the robot, wherein the first signal is received in response to the second signal.

In Example 22, the sensor data management system of any one of Examples 19 to 21, wherein the first signal further represents a location corresponding to sensor data detected by the external sensor, and wherein operating according to the second operational mode includes sending a signal representing a request for sensor data of the external sensor.

In Example 23, the sensor data management system of any one of Examples 15 to 22, wherein, if the processor operates according to the second operational mode, the processor is configured to determine an amount of camera data necessary to bring the confidence factor within the predetermined range and to receive an amount of camera data corresponding to the determined amount of camera data.

In Example 24, the sensor data management system of any one of Examples 15 to 23, wherein the first sensor data include pressure sensor data, touch sensor data, torque sensor data, temperature sensor data, sound sensor data, range sensor data, LIDAR sensor data, Wi-Fi sensor data, data derived from Wi-Fi sensor data, Bluetooth sensor data, data derived from Bluetooth sensor data, or any of these.

In Example 25, the sensor data management system of Example 24, wherein the first sensor data further include data of any sensor configured to detect electromagnetic waves having a wavelength outside the range of 380 nm to 700 nm.

In Example 26, the sensor data management system of any one of Examples 24 or 25, wherein the second sensor data include data of a sensor configured to detect electromagnetic waves having a wavelength within the range of 380 nm to 700 nm.

In Example 27, the sensor data management system of any one of Examples 15 to 26, wherein the robot further includes a convolutional neural network, configured to receive first sensor data, and to output robot environment information based on the received first sensor data, and wherein the processor is configured to perform a robot operation based on the robot environment information.

In Example 28, the sensor data management system of any one of Examples 15 to 27, wherein operating according to the second operational mode further includes switching on a camera, wherein the camera is a camera in or on the robot, or wherein the camera is a camera external to the robot in a vicinity of the robot.

In Example 29, a means for sensor data management, including: a processing means, configured to: operate according to a first operational mode or a second operational mode, wherein the first operational mode includes performing an environmental perception operation using first sensor data, wherein the first sensor data include no camera data, and wherein the second operational mode includes performing the environmental perception operation using second sensor data, wherein the second sensor data include camera data; while operating according to the first operational mode, determine a confidence factor representing a confidence of the environmental perception operation; determine whether or not the confidence factor is outside of a predetermined range; and if the confidence factor is outside of the predetermined range, operate according the second operational mode.

In Example 30, the means for sensor data management of Example 29, wherein the environmental perception operation includes detecting an object within a vicinity of the robot or detecting an environmental condition of the vicinity of the robot.

In Example 31, the means for sensor data management of Example 29, wherein the robot is configured to operate according to one of a plurality of context modes, each context mode of the plurality of context modes having a unique predetermined range; wherein determining whether the confidence factor is outside of the predetermined range includes determining whether the confidence factor is outside of the unique predetermined range of the context mode according to which the robot is operating.

In Example 32, the means for sensor data management of Example 31, wherein the plurality of context modes includes a safety mode and a power-saving mode, and wherein the unique predetermined range of the safety mode requires a greater confidence factor than a confidence factor required by the unique predetermined range of the power-saving mode.

In Example 33, the means for sensor data management of any one of Examples 29 to 32, wherein the processing means is further configured to receive a first signal representing sensor identifiers of sensors within a vicinity of the robot.

In Example 34, the means for sensor data management of Example 33, wherein the processing means is further configured to designate the sensor identifiers of the sensors within the vicinity of the robot as detecting first sensor data or second sensor data, based on sensor type.

In Example 35, the means for sensor data management of Example 33 or 34, wherein the processing means is further configured to control a transceiver to send a second signal representing a request for sensor identifiers of sensors within a vicinity of the robot, wherein the first signal is received in response to the second signal.

In Example 36, the means for sensor data management of any one of Examples 33 to 35, wherein the first signal further represents a location within the vicinity of the robot corresponding to sensor data detected by a sensor of the sensors within the vicinity of the robot, and wherein operating according to the second operational mode includes sending a signal representing a request for sensor data of a sensor of the plurality of sensors whose sensor data correspond to a location of the robot.

In Example 37, the means for sensor data management of any one of Examples 29 to 36, wherein, if the processing means operates according to the second operational mode, the processing means is configured to determine an amount of camera data necessary to bring the confidence factor within the predetermined range and to receive an amount of camera data corresponding to the determined amount of camera data.

In Example 38, the means for sensor data management of any one of Examples 29 to 37, wherein the first sensor data include pressure sensor data, touch sensor data, torque sensor data, temperature sensor data, sound sensor data, range sensor data, LIDAR sensor data, or any of these.

In Example 39, the means for sensor data management of Example 38, wherein the first sensor data further include data of any sensor configured to detect electromagnetic waves having a wavelength outside the range of 380 nm to 700 nm.

In Example 40, the means for sensor data management of any one of Examples 38 or 39, wherein the second sensor data include data of a sensor configured to detect electromagnetic waves having a wavelength within the range of 380 nm to 700 nm.

In Example 41, the means for sensor data management of any one of Examples 29 to 40, wherein the robot further includes a convolutional neural network, configured to receive first sensor data, and to output robot environment information based on the received first sensor data, and wherein the processing means is configured to perform a robot operation based on the robot environment information.

In Example 42, the means for sensor data management of any one of Examples 29 to 41, wherein operating according to the second operational mode further includes switching on a camera, wherein the camera is a camera in or on the robot, or wherein the camera is a camera external to the robot in a vicinity of the robot.

In Example 43, a non-transitory computer readable medium, including instructions that, if executed, cause a processor to: operate according to a first operational mode or a second operational mode, wherein the first operational mode includes performing an environmental perception operation for a robot using first sensor data, wherein the first sensor data include no camera data, and wherein the second operational mode includes performing the environmental perception operation using second sensor data, wherein the second sensor data include camera data; while operating according to the first operational mode, determine a confidence factor representing a confidence of the environmental perception operation; determine whether or not the confidence factor is outside of a predetermined range; and if the confidence factor is outside of the predetermined range, operate according the second operational mode.

In Example 44, the non-transitory computer readable medium of Example 43, wherein the environmental perception operation includes detecting an object within a vicinity of the robot or detecting an environmental condition of the vicinity of the robot.

In Example 45, the non-transitory computer readable medium of Example 43, wherein the instructions are further configured to cause the processor to operate according to one of a plurality of context modes, each context mode of the plurality of context modes having a unique predetermined range; wherein determining whether the confidence factor is outside of the predetermined range includes determining whether the confidence factor is outside of the unique predetermined range of the context mode according to which the robot is operating.

In Example 46, the non-transitory computer readable medium of Example 45, wherein the plurality of context modes includes a safety mode and a power-saving mode, and wherein the unique predetermined range of the safety mode requires a greater confidence factor than a confidence factor required by the unique predetermined range of the power-saving mode.

In Example 47, the non-transitory computer readable medium of any one of Examples 43 to 46, wherein the instructions are further configured to cause the processor to receive a first signal representing sensor identifiers of sensors within a vicinity of the robot.

In Example 48, the non-transitory computer readable medium of Example 47, wherein the instructions are further configured to cause the processor to designate the sensor identifiers of the sensors within the vicinity of the robot as detecting first sensor data or second sensor data, based on sensor type.

In Example 49, the non-transitory computer readable medium of Example 47 or 48, wherein the instructions are further configured to cause processor to control a transceiver to send a second signal representing a request for sensor identifiers of sensors within a vicinity of the robot, wherein the first signal is received in response to the second signal.

In Example 50, the non-transitory computer readable medium of any one of Examples 47 to 49, wherein the first signal further represents a location within the vicinity of the robot corresponding to sensor data detected by a sensor of the sensors within the vicinity of the robot, and wherein operating according to the second operational mode includes sending a signal representing a request for sensor data of a sensor of the plurality of sensors whose sensor data correspond to a location of the robot.

In Example 51, the non-transitory computer readable medium of any one of Examples 43 to 50, wherein, if the processor operates according to the second operational mode, the instructions are further configured to cause processor to determine an amount of camera data necessary to bring the confidence factor within the predetermined range and to receive an amount of camera data corresponding to the determined amount of camera data.

In Example 52, the non-transitory computer readable medium of any one of Examples 43 to 51, wherein the first sensor data include pressure sensor data, touch sensor data, torque sensor data, temperature sensor data, sound sensor data, range sensor data, LIDAR sensor data, or any of these.

In Example 53, the non-transitory computer readable medium of Example 52, wherein the first sensor data further include data of any sensor configured to detect electromagnetic waves having a wavelength outside the range of 380 nm to 700 nm.

In Example 54, the non-transitory computer readable medium of any one of Examples 52 or 53, wherein the second sensor data include data of a sensor configured to detect electromagnetic waves having a wavelength within the range of 380 nm to 700 nm.

In Example 55, the non-transitory computer readable medium of any one of Examples 43 to 54, wherein the instructions are further configured to cause the processor to operate a convolutional neural network, configured to receive first sensor data, and to output robot environment information based on the received first sensor data, and wherein the processor is configured to perform a robot operation based on the robot environment information.

In Example 56, the non-transitory computer readable medium of any one of Examples 43 to 55, wherein operating according to the second operational mode further includes switching on a camera, wherein the camera is a camera in or on the robot, or wherein the camera is a camera external to the robot in a vicinity of the robot.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A robot, including:
    a processor, configured to:
        operate according to a first operational mode, wherein the first operational mode comprises performing an environmental perception operation using first sensor data, wherein the first sensor data comprise no camera data; and
        while operating according to the first operational mode, determine a confidence factor representing a confidence of the environmental perception operation;
        determine whether or not the confidence factor is outside of a range; and
        when the confidence factor is outside of the range, operate according to a second operational mode;
        wherein the second operational mode comprises performing the environmental perception operation using second sensor data, wherein the second sensor data comprise camera data;
        wherein the robot is configured to operate according to one of a plurality of context modes, each context mode of the plurality of context modes having a unique range;
        wherein determining whether the confidence factor is outside of the range comprises determining whether the confidence factor is outside of the unique range of the context mode according to which the robot is operating; and
        wherein the plurality of context modes comprises a safety mode and a power-saving mode, and wherein the unique range of the safety mode requires a greater confidence factor than a confidence factor required by the unique range of the power-saving mode.

2. The robot of claim 1, wherein the environmental perception operation comprises detecting an object within a vicinity of the robot or detecting an environmental condition of the vicinity of the robot.

3. The robot of claim 1, wherein the processor is further configured to receive a first signal representing sensor identifiers of sensors within a vicinity of the robot.

4. The robot of claim 3, wherein the processor is further configured to designate the sensor identifiers of the sensors within the vicinity of the robot as detecting first sensor data or second sensor data, based on sensor type.

5. The robot of claim 3, wherein the processor is further configured to control a transceiver to send a second signal representing a request for sensor identifiers of sensors within a vicinity of the robot, wherein the first signal is received in response to the second signal.

6. The robot of claim 3, wherein the first signal further represents a location within the vicinity of the robot corresponding to sensor data detected by a sensor of the sensors within the vicinity of the robot, and wherein operating according to the second operational mode comprises sending a signal representing a request for sensor data of a sensor of the plurality of sensors whose sensor data correspond to a location of the robot.

7. The robot of claim 1, wherein, if the processor operates according to the second operational mode, the processor is configured to determine an amount of camera data necessary to bring the confidence factor within the range and to receive an amount of camera data corresponding to the determined amount of camera data.

8. The robot of claim 1, wherein the first sensor data comprise pressure sensor data, touch sensor data, torque sensor data, temperature sensor data, sound sensor data, range sensor data, LIDAR sensor data, or any of these.

9. The robot of claim 8, wherein the first sensor data further comprise data of any sensor configured to detect electromagnetic waves having a wavelength outside the range of 380 nm to 700 nm.

10. The robot of claim 8, wherein the second sensor data comprise data of a sensor configured to detect electromagnetic waves having a wavelength within the range of 380 nm to 700 nm.

11. The robot of claim 1, wherein the robot further comprises a convolutional neural network, configured to receive first sensor data, and to output robot environment information based on the received first sensor data, and wherein the processor is configured to perform a robot operation based on the robot environment information.

12. The robot of claim 1, wherein operating according to the second operational mode further comprises switching on a camera.

13. A non-transitory computer readable medium, comprising instructions which, if executed, cause a processor to:
operate according to a first operational mode, wherein the first operational mode comprises performing an environmental perception operation using first sensor data, wherein the first sensor data comprise no camera data; and
while operating according to the first operational mode, determine a confidence factor representing a confidence of the environmental perception operation;
determine whether or not the confidence factor is outside of a range; and
when the confidence factor is outside of the range, operate according to a second operational mode
wherein the second operational mode comprises performing the environmental perception operation using second sensor data, wherein the second sensor data comprise camera data;
wherein the robot is configured to operate according to one of a plurality of context modes, each context mode of the plurality of context modes having a unique range;
wherein determining whether the confidence factor is outside of the range comprises determining whether the confidence factor is outside of the unique range of the context mode according to which the robot is operating; and
wherein the plurality of context modes comprises a safety mode and a power-saving mode, and wherein the unique range of the safety mode requires a greater confidence factor than a confidence factor required by the unique range of the power-saving mode.

14. The non-transitory computer readable medium claim 13, wherein the environmental perception operation comprises detecting an object within a vicinity of the robot or detecting an environmental condition of the vicinity of the robot.

15. The non-transitory computer readable medium of claim 13, wherein the instructions are further configured to cause the processor to operate according to one of a plurality of context modes, each context mode of the plurality of context modes having a unique range; wherein determining whether the confidence factor is outside of the range comprises determining whether the confidence factor is outside of the unique range of the context mode according to which the robot is operating.

16. A sensor data management system, comprising:
a robot, comprising:
a processor, configured to
operate according to a first operational mode, wherein the first operational mode includes performing an environmental perception operation using first sensor data, wherein the first sensor data include no camera data, and while operating according to the first operational mode, determine a confidence factor representing a confidence of the environmental perception operation; determine whether or not the confidence factor is outside of a range; and when the confidence factor is outside of the range, operate according to a second operational mode, wherein the second operational mode includes performing the environmental perception operation using second sensor data, wherein the second sensor data include camera data;
wherein the robot is configured to operate according to one of a plurality of context modes, each context mode of the plurality of context modes having a unique range;
wherein determining whether the confidence factor is outside of the range comprises determining whether the confidence factor is outside of the unique range of the context mode according to which the robot is operating; and
wherein the plurality of context modes comprises a safety mode and a power-saving mode, and wherein the unique range of the safety mode requires a greater confidence factor than a confidence factor required by the unique range of the power-saving mode.

17. The sensor data management system of claim 16, wherein the environmental perception operation includes detecting an object within a vicinity of the robot or detecting an environmental condition of the vicinity of the robot.

18. The sensor data management system of claim 16, further comprising an external sensor circuit, external to and not directly controlled by the robot, wherein the external sensor circuit includes an external sensor; wherein the robot is further configured to receive a first signal from the external sensor circuit representing a sensor identifier of the external sensor.

* * * * *